United States Patent
Farr

[11] 4,240,330
[45] Dec. 23, 1980

[54] SERVO BOOSTER ASSEMBLIES

[75] Inventor: Glyn P. R. Farr, Leek Wootton, England

[73] Assignee: Girling Limited, Birmingham, England

[21] Appl. No.: 914,926

[22] Filed: Jun. 12, 1978

[30] Foreign Application Priority Data

Jun. 11, 1977 [GB] United Kingdom ............... 24462/77
Jun. 22, 1977 [GB] United Kingdom ............... 26052/77

[51] Int. Cl.$^3$ .............................................. F15B 9/10
[52] U.S. Cl. ................... 91/369 R; 91/376 R; 74/107; 74/110
[58] Field of Search ................ 74/99 A, 110, 107; 60/594; 91/369 R, 376 R

[56] References Cited

U.S. PATENT DOCUMENTS

| | | | |
|---|---|---|---|
| 2,395,223 | 2/1946 | Ingres | 60/59 X |
| 2,806,654 | 9/1957 | Daly | 74/110 |
| 3,109,282 | 11/1963 | Price | 91/369 R |
| 3,118,309 | 1/1964 | Thompson | 74/99 A |
| 3,997,033 | 12/1976 | Bulmer | 74/99 A |

Primary Examiner—Paul E. Maslousky
Attorney, Agent, or Firm—Scrivener, Parker, Scrivener and Clarke

[57] ABSTRACT

Servo boosters for vehicle hydraulic braking systems are described which incorporate a novel arrangement for providing an increasing reaction force on the input member in response to an increasing output force. In the novel arrangement a first thrust assembly is interposed between the input member and the output member, and a second thrust assembly is interposed between the movable wall of the booster, which may be a diaphragm or a piston, and the output member. The thrust assemblies each generally consist of rotatable parallel plates having inclined ramp surfaces on opposed faces co-operating with balls or rollers located between the plates. Some of the plates of the two thrust assemblies are keyed together. Axial forces between the members generate torques in the thrust assemblies and since the torques must balance each other as a result of the connections between the plates a fixed relationship is maintained between the input and output forces and the force exerted by the movable wall. In the constructions disclosed a single plate is common to both thrust assemblies.

14 Claims, 10 Drawing Figures

SERVO BOOSTER ASSEMBLIES

SPECIFIC DESCRIPTION

This invention relates to servo booster assemblies for vehicle braking systems of the kind in which the force from an axially movable pedal-operated input member is transmitted to an axially movable output member, and the force applied to the output member is augmented by a movable wall subjected to a fluid pressure differential which is controlled by valve means.

It is desirable that such booster assemblies should include a feedback arrangement whereby an increasing force is applied to the input member in response to an increasing output force to provide a reaction to movement of the input member, or 'feel' as it is often called.

Various arrangements have been proposed to produce such a reaction force. Early designs incorporated force reducing lever mechanisms. More recently a deformable rubber disc has been used, with the advantages of cheapness and compact size as compared with the lever mechanisms.

Disadvantages of the rubber disc arrangement, however, are firstly that the rubber will not readily deform when it is cold, and secondly that, particularly with high boost ratio constructions, substantial energy is lost due to hysteresis.

The aim of the invention is to provide a mechanism which produces a reaction force and which is capable of being made compact in size yet having low hysteresis losses and being relatively insusceptible to extremes of temperature.

The invention stems from an appreciation of the fact that low hysteresis losses may be achieved with a device incorporating rolling parts rather than sliding parts.

According to the invention a servo booster assembly of the kind set forth the pedal force applied to the input member is transmitted to the output member through a first thrust assembly, and the force exerted by the movable wall is transmitted to the output member through a second thrust assembly axially aligned with said first thrust assembly, each of the thrust assemblies comprising two axially spaced apart thrust members which are angularly movable relative to each other and between which are located balls or rollers co-operating with inclined circumferentially extending ramp surfaces on or in the adjacent faces of the thrust members, the thrust members of the first thrust assembly on which the input member acts being held against angular movement relative to one of the thrust members of the second thrust assembly, and the other thrust member of the first assembly being held against angular movement relative to the other thrust member of the second thrust assembly.

In such a booster assembly the pedal force, the force exerted by the movable wall, and the force exerted on the output member are maintained in a predetermined relationship to one another. This relationship is determined by the two conditions that the sum of the pedal force and the force exerted by the movable wall is equal to the force exerted on the output member, disregarding friction forces, and that the couples exerted on the thrust assemblies are equal to each other owing to the connections between the respective thrust members.

The above relationship between the pedal and output forces also depends upon the relative sizes of the ramp angles of the two thrust assemblies and upon the ratio of the radial distances of the balls or rollers of the two assemblies from the common axis of the assemblies.

Preferably the thrust member upon which the movable wall acts is held against rotation relative thereto, and the arrangement is such that this thrust member is subjected to a substantially zero couple during operation of the booster assembly, the torque reaction of the input member on this thrust member being controlled by the substantially equal torque reaction of the output member on the thrust member.

Preferably a single member constitutes one thrust member of both thrust assemblies, the other two thrust members being movable axially relative to each other but being keyed to each other against relative rotation.

In one preferred booster assembly the thrust member of the first thrust assembly upon which the input member acts is keyed against relative rotation to, but is axially slidable relative to, the thrust member of the second thrust assembly that acts upon the output member, and the other two thrust members are constituted by a single member which is positioned axially between the thrust members acted upon by the input member and acting on the output member.

Thus in this arrangement the thrust assemblies are arranged in series with each other. Although this arrangement has certain advantages, one disadvantage is that the balls or rollers of the second thrust assembly are subjected to the sum of the pedal force and the force exerted by the movable wall.

This disadvantage is overcome in a second preferred booster assembly in which the thrust member of the first assembly upon which the input member acts is keyed against relative angular movement to the thrust member of the second assembly upon which the movable wall acts, and a single output thrust member acting on the output member constitutes said other thrust members of both thrust assemblies.

Thus with this arrangement the balls or rollers of the second thrust assembly are subjected only to the force exerted by the movable wall, the pedal force being applied directly to the output thrust member by the balls or rollers of the first assembly.

Preferably the arrangement of the thrust members is then such that the balls or rollers of the first thrust assembly lie substantially in the same plane transverse to the common axis of the assemblies as the balls or rollers of the second thrust assembly. This enables the booster assembly to be made of relatively short axial length.

Preferably the arrangement of the thrust members is such that the balls or rollers of the first assembly are angularly disposed intermediate balls or rollers of the second assembly, and conveniently the balls or rollers of both assemblies are located at the same radial distance from the common axis of the two thrust assemblies.

The last arrangement of the balls or rollers may be facilitated by mounting one of the two thrust members that are keyed together in a substantially radially extending recess in that face of the other keyed thrust member which opposes said output thrust member.

Said one thrust member may comprise a spider when each thrust assembly incorporates more than two balls or rollers, but when each thrust assembly has only two balls or rollers then said one thrust member preferably comprises an oblong rectangular block received in a diametral slot in the other keyed thrust member, the two balls or rollers of one assembly co-operating with diametrically spaced portions of block, and the two balls or rollers of the other assembly co-operating with portions of said other keyed thrust member respectively on opposite sides of said slot.

A thrust bearing, conveniently in the form of a ball bearing or a domed head co-operating with a part-spherical recess, is preferably provided between the output member and a thrust member, and/or between the input member and a thrust member, when the arrangement is such that the relevant thrust member moves angularly in use.

In the Complete Specification of our co-pending U.K. patent application No. 20988/76 we have described and claimed a fluid-pressure operated servo-motor assembly for a vehicle braking system of the kind in which an effort from a pedal-operated input member is transmitted to an output member through a movable wall in a housing and, when the servo-motor is operated, the effort from a pedal-operated input member is transmitted to an output member through a movable wall in a housing and, when the servo-motor is operated, the assembly, in which the valve means is located in a stationary part of the housing and is by an operating assembly comprising an angularly movable rotary operating member, an axially movable transmission member for applying an operating force to the rotary member, and camming means for translating axial movement of the transmission member into angular movement of the rotary member.

In accordance with a preferred feature of the present invention the valve means is operated in response to angular movement relative to the housing of one of the thrust members.

Preferably the valve means comprises a spool valve member slidable in a bore extending transversely of the housing and the spool valve member is formed with a rack engaged by a pinion which is keyed to or integral with the thrust member that acts upon the output member.

With such an arrangement it is unnecessary to provide a return spring for a spool valve, as compared with the constructions described in the latter Complete Specification.

The movable wall may comprise an hydraulic piston or a diaphragm assembly, and the diaphragm assembly may be subjected to pressures above or below atmospheric pressure.

Four pedal-operated servo booster assemblies in accordance with the invention will now be described, by way of example only, with reference to the accompanying drawings in which.

Figures 1, 2:
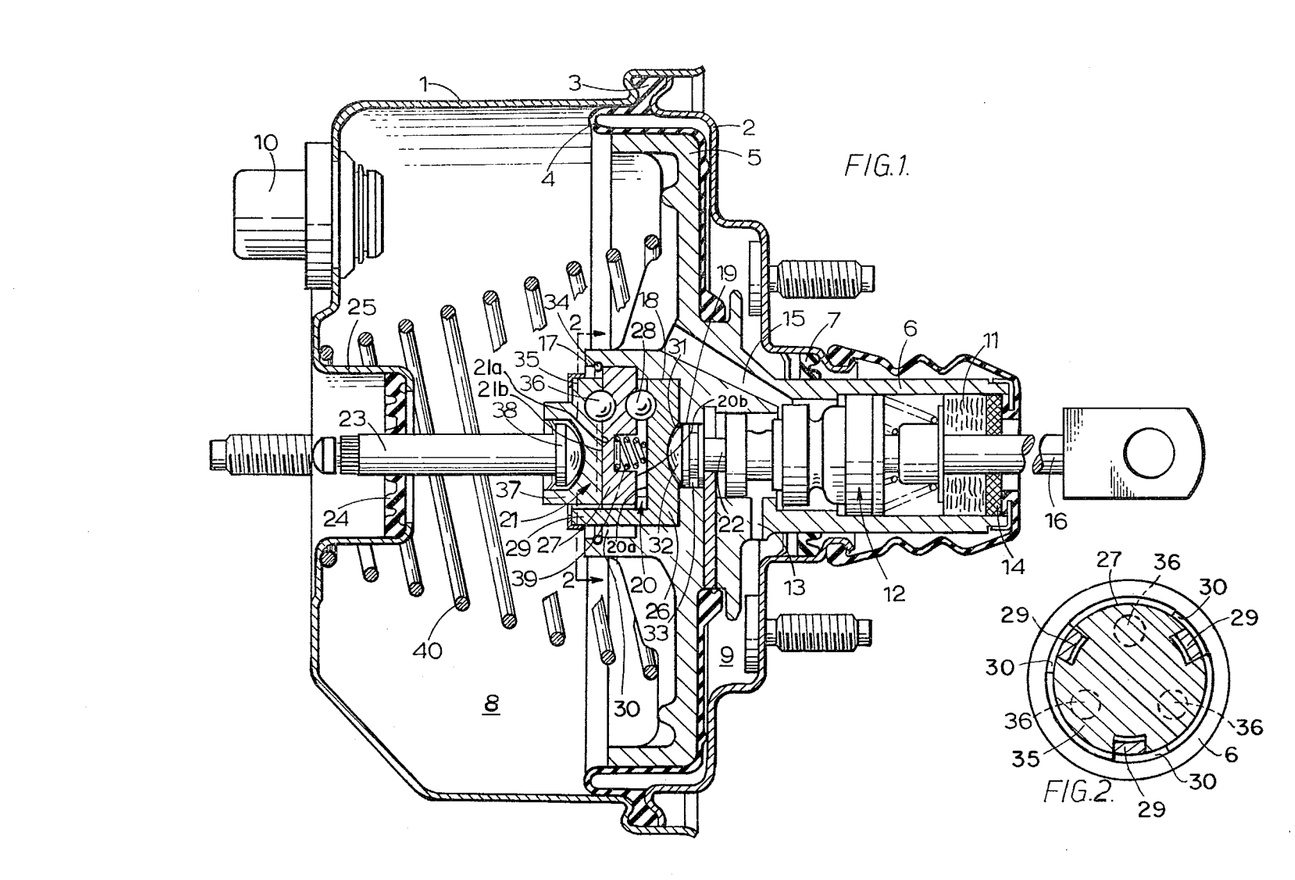
FIG. 1 is a longitudinal cross-section through a vacuum operated diaphragm booster assembly, with the pedal-operated input member being shown in its retracted position.
FIG. 2 is a section of a detail on the line 2—2 of FIG. 1.

The booster assembly of FIG. 1 comprises a first housing part 1 and a second housing part 2 between which is clamped the peripheral bead 3 of a diaphragm 4 supported on a diaphragm plate 5 integral with a substantially cylindrical body 6 which is axially slidable in the housing and is sealed to the second housing part 2 by an annular seal 7. A first chamber is defined in the housing in front of the diaphragm 4, and a second chamber 9 is defined between the diaphragm 4 and the seal 7. An inlet 10 to the chamber 8 is connected in use to a vacuum source.

The body 6 is provided with a multi-stepped bore 11 in which operates a valve assembly 12 of well known type which controls communication firstly between a radial port 13 formed in the body 6 and extending from the chamber 9, and the outer end of the bore 11, which communicates with atmosphere through a filter element 14, and secondly between the port 13 and a passage 15 communicating with the chamber 8. When pedal-operated pushrod 16 is retracted relative to the body 6 chambers 8 and 9 are in communication with each other through passage 15 and are both subjected to vacuum. On forward movement of pushrod 16 relative to the body 6 the chambers 8 and 9 are first isolated from each other by the valve assembly, and then chamber 9 is connected to atmosphere so that a pressure differential is applied to the diaphragm to move it forwardly. It will be noted that the condition of the valve assembly is responsive to the relative axial position of the pushrod 16 and body 6 and not to their absolute positions.

The body 6 at its forward end is formed with a multi-stepped bore having bore portions 17, 18 and 19 communicating with the multi-stepped bore 11. Bore portions 17 and 18 receive first and second thrust assemblies 20 and 21 which are interposed between a pedal-operated input member 22 axially aligned with an output member 23, each of which comprises a headed rod. The rod 23 is axially slidable through a seal 24 retained in an inwardly extending tubular portion 25 of the first housing part 1 and is adapted to engage in use with the input member of a master cylinder to which the housing of the booster assembly is then attached.

The first thrust assembly 20 comprises two thrust members in the form of parallel metal plates 26 and 27 whose confronting faces define cam walls 20a and 20b, respectively extending in planes normal to the axis of the booster assembly and between which are located three equi-angularly spaced balls 28 which co-operate with circumferentially extending ramp surfaces formed in the opposed faces of the members 26 and 27. The plate 26 is provided around its periphery with three equi-angularly spaced and forwardly extending arms 29 which pass with clearance through circumferentially extending slots 30, shown in FIG. 2, formed in the periphery of plate 27 and permitting an amount of relative angular movement of the plates 26 and 27. The plate 26 is formed in the centre of its rear surface with a part-spherical recess 31 which receives the part-spherical head 32, of smaller radius, of the input member 22 to form a low friction thrust bearing. The head 22 is sealed in bore portion 19 of body 6 by an annular seal 33.

Plate 27 is keyed against angular movement relative to the body 6 by circumferentially spaced recesses in its periphery which engage with internal splines, not shown, in bore portion 17. A circlip 34 retains the plate 27 in bore portion 17. Second thrust assemblies 20 and 21 and, as indicated schematically in FIG. 1a, is therefore equivalent to two thrust members 27a and 27b that are keyed against relative angular movement by a key 27c.

The second thrust assembly 21 is defined between the confronting faces on the opposite sides of plate 27 and a third plate 35, respectively. These two confronting faces define a second set of cam walls 21a, 21b having three equi-angularly spaced balls 36 located between them in the same manner as in the first thrust assembly, although the ramp angle of the second assembly is less than that of the first assembly as will be explained hereafter. Plate 35 is formed in its periphery with three equi-angularly spaced recesses through which arms 29 are slidable and which key the plate 35 of the second thrust assembly 21 against relative angular movement to the plate 26 of the first thrust assembly 20. Plate 35 has a recess within which is received the head 38 on the output rod 23, the head having a part-spherical surface to effect a low friction rotary coupling with the plate 35.

A coiled compression spring 39 is received in part in an axial bore extending forwardly into the plate 27 and biasses apart the cam walls of the plates 28 and 27 of the first thrust assembly 20.

Diaphragm plate 5 is biassed rearwardly by compression spring 40.

The operation of the booster assembly will now be described. On initial forward movement of the pushrod 16 the two chambers 8 and 9 are isolated from one another, as has previously been described, and the chamber 9 is placed in communication with atmosphere. During this initial movement of the pushrod 16 input member 22 is subjected to a progressively increasing force, and when the pre-load force of spring 39 is overcome the plate 26 is urged leftwardly and is progressively angularly rotated by the interaction of the balls 28 and the corresponding circumferential ramps in the confronting faces of the cam walls of plates 26 and 27, with increasing force on the input member 22. The couple generated by the first thrust assembly 20 is applied to the second thrust assembly 21, due to the plate non-rotatable 27 being common to the two assemblies and to the plate 26 being keyed to the plate 35. The ramp angle of the ramps of the second thrust assembly 21 is made less than the ramp angle of the ramps of the first thrust assembly to produce the required relationship between the axial forces in the two assemblies when the couples generated are in equilibrium. The effect of this, as will be explained in detail hereafter, is that a greater axial thrust is needed in the second assembly to produce a couple that will balance the couple produced by the axial thrust to which the first assembly 20 is subjected by the input member 22. The reason for this can be seen by considering the couple that would be generated in a thrust assembly by a given axial force.

The couple produced will increase with increasing ramp angle due to the increasing wedge action. Conversely if the couple is maintained constant then the corresponding axial force required to produce that couple will decrease with increasing ramp angle. The difference between the axial thrust in the two assemblies, in which the couples oppose each other and are therefore equal, is supplied by the force exerted on the plate 26 by the body 6, due to the pressure differential between chambers 8 and 9 acting on the diaphragm 4 and diaphragm plate 5.

Since the plate 27 is common to the two thrust assemblies and since the torque reaction of the first thrust assembly is cancelled by the torque reaction of the second thrust assembly a substantially zero couple is applied to the body 6 by the plate 27.

Thus the force applied by the plate 35 to the output member 23 is greater than the force applied to the input member 22, which is substantially equal to the force applied to the pushrod 16, so that as the output force is increased in response to forward movement of the pushrod 16 the reaction force developed in the pushrod 16 increases in a predetermined manner.

The relationship between the various forces will now be considered. For convenience let the axial force applied to the input member be $F_I$, the axial force applied to the output member 23 be $F_O$, the axial force applied to the plate 27 by the body 6 be $F_B$, the ramp angle of the ramp surfaces of the first thrust assembly 20 be $\theta$, and the ramp angle of the second thrust assembly 21 be $\alpha$.

Since the axial forces are in balance, then $$F_O = F_I + F_B$$

The couple generated by the first thrust assembly which is subjected to the force $F_I$ is $F_I R_1 \tan \theta$, where $R_1$ is the radial distance of the balls of the first thrust assembly 20 from the axis of the assembly.

The couple generated by the second thrust assembly which is subjected to the force $F_O$ is $F_O R_2 \tan \alpha$, where $R_2$ is the radial distance of the balls of the second thrust assembly 21 from the axis of that assembly.

Since the couples are the same:

$$F_I R_1 \tan \theta = F_O R_2 \tan \alpha$$

As the torque reactions on the plate 27 are also the same the torque is cancelled within the mechanism.

Now, $R_1 = R_2$ in the construction described, and if a boost ratio of two, for example, is to be achieved then $F_O = 2 F_I$ and it is then required than $\tan \theta = 2 \tan \alpha$.

For example, $\theta = 30°$ and $\alpha = 16.1°$, is in accordance with this relationship and will result in a ratio of two between the output and input forces, when $R_1 = R_2$.

It will be appreciated that the ratio between the input and output forces may be altered by varying the ratio $R_1/R_2$.

On reduction of the force applied to the pushrod 16 the output force causes reverse angular movement of the plates 35 and 26 until the valve assembly 12 reconnects the chambers 8 and 9 to reduce the pressure differential acting across the diaphragm 4 and thus reduce the output force.

Figure 3:
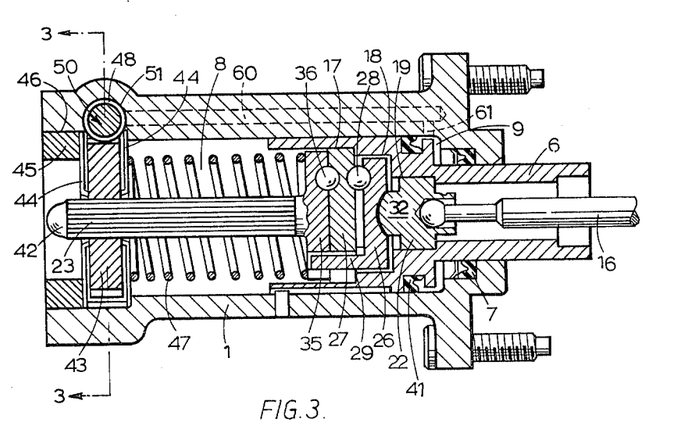
FIG. 3 is a longitudinal cross-section through an hydraulically operated booster assembly.
Figure 4:
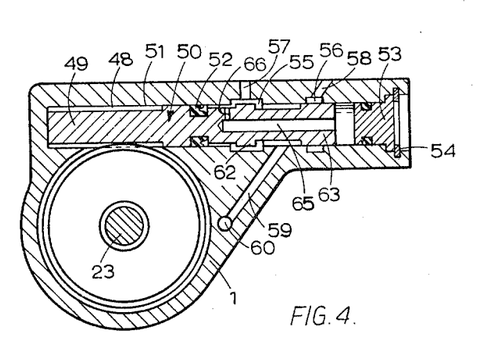
FIG. 4 is a transverse cross-section of the booster assembly of FIG. 3 taken on the line 3—3.

In the embodiment of FIGS. 3 and 4 corresponding reference numerals have been used to indicate parts corresponding to those of the embodiment of FIGS. 1 and 2. In this assembly the movable wall comprises a piston 6 subject in use to hydraulic fluid pressure in chamber 9 defined between an annular seal 41 on the piston and seal 7 located in the housing 1.

The output member 23 of this construction comprises a splined shaft which is integral at its rear end with the plate 35 and is formed at its front end with a rounded nose 42 adapted to engage with a part-spherical recess formed in the rear end of the input member of a master cylinder, now shown, to which the booster assembly is connected in use. In use the output member 23 will rotate relative to the input member of the master cylinder.

An internally splined pinion 43 is keyed by its splines to the output member 23 and is held against axial movement realtive to the housing by a cage assembly 44 retained in position by an annular retainer 45 located in a counterbore 46 in the housing. A coiled compression spring 47 acts between the cage assembly 44 and the plate 35 to prevent the balls from becoming misplaced from the recess in the plates 26, 27 and 35 and to provide a return force for the piston 6. The pinion 43 meshes with the annular teeth of a rack 48 formed on the inner end portion 49 of a spool valve member 50 working in a transversely extending bore 51 of the housing 1. The spool valve member 50 is sealed in the bore 51 by an annular seal 52 and the bore is closed at its outer end by a plug 53 held in position by an annular retainer 54. Bore 51 is provided with two spaced apart enlarged portions 55 and 56 which permenantly communicate respectively with ports 57 and 58 for connection in use respectively to a reservoir and to a pressurised hydraulic accumulator. An inclined bore 59 in the housing communicates by way of a longitudinal bore 60 and a short trensverse bore 61 with the pressure space 9, and opens into bore 51 at a position midway between the enlarged bore portions 55 and 56. The spool valve member is provided with two spaced apart annular lands 62 and 63, and with an blind axial bore 65 communicating with a short transverse bore 66.

When the spool valve member is in the position shown in the drawings, with the pushrod in a substantially retracted position, the bore 59 is in communication with the port 57 and the pressure space 9 is thus connected to reservoir. On forward movement of the pushrod 16 the plates 26, 29 and 35 are rotated relative to one another, as described in relation to the assembly of FIG. 1, and rotation of the pinion 43 results in rightward movement, in FIG. 4, of the spool valve member 50. Communication between ports 57 and 59 is cut-off by land 62, and movement of the land 63 to the right establishes communication between bore 59 and the port 58 to pressurise the pressure space 9. On reverse movement of the pushrod 16 the plate 35 and output member 23 are rotated in the reverse direction by the output force taking with them the pinion 43 and thus moving the spool valve member 50 leftwards in FIG. 4 to cut-off communication between the pressure space 9 and the hydraulic accumulator and to connect the pressure space 9 to reservoir.

It will be noted that it is not necessary to provide the spool valve member 50 with a return spring as there is a positive operating force on the spool in both directions.

In each of the booster assemblies of FIGS. 1 to 4 the balls of the thrust assemblies co-operate with independent circumferentially spaced recesses. It will be appreciated that if desired the ramp surfaces of each thrust member could be provided by a single helical ramp engaged by a split roller race.

Figures 5, 6:
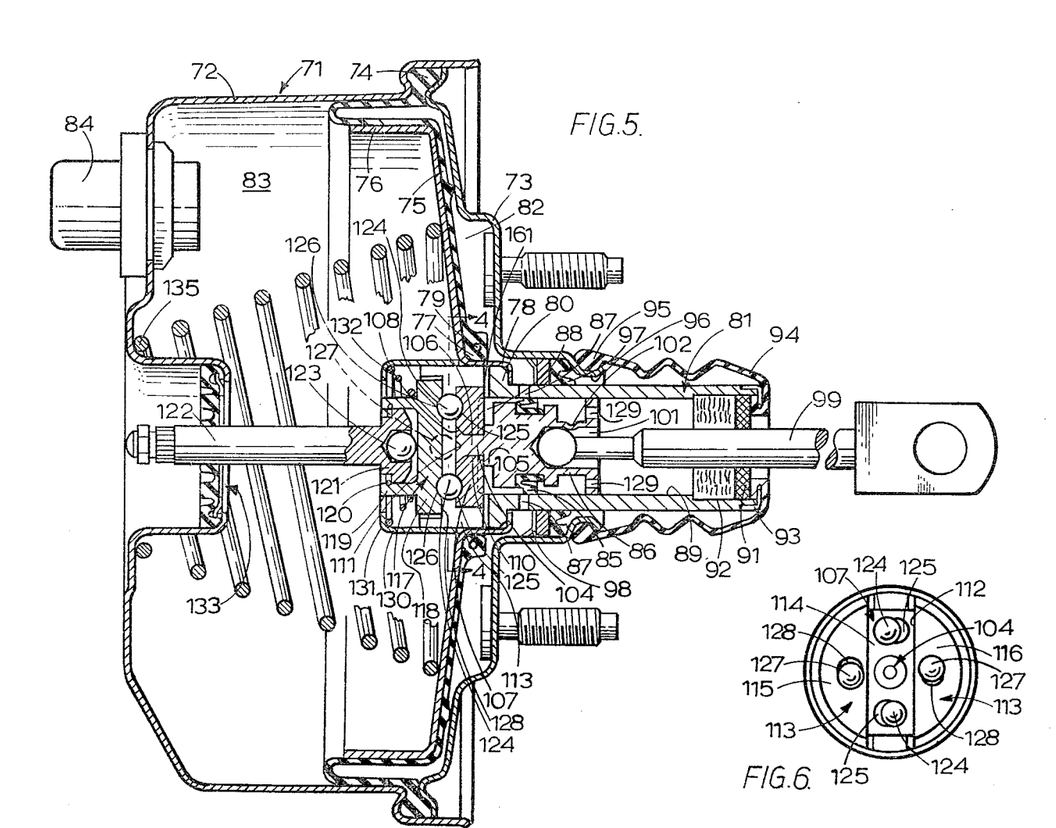
FIG. 5 is a longitudinal cross-section through a further vacuum operated diaphragm booster assembly, with the pedal-operated input member being shown in its retracted position.
FIG. 6 is a transverse cross-sectional view of the thrust assemblies taken on the line 4—4 of FIG. 5 and showing the two pairs of diametrically opposed balls of the respective assemblies.

The booster assembly of FIG. 5 comprises a sheet metal housing 71 formed in two parts 72 and 73 between which is clamped the peripheral bead 74 of a rolling diaphragm 75 supported on a diaphragm 76 and having a further bead 77 retained on a rearwardly extending tubular extension 78 to the plate 76 by a retaining ring 79 moulded into the bead 77. The rear end of the tubular extension 78 is turned radially inwardly over a rearwardly facing shoulder 80 at the change in diameter of a stepped body member 81, shown in FIG. 7.

High and low pressure chambers 82 and 83 respectively are defined within the housing on opposite sides of the diaphragm 75 the low pressure chamber 83 being permanently connected in use to a vacuum source through an inlet 84, and the high pressure chamber 82 being connected alternatively to the lower pressure chamber 83 or to atmosphere in dependence upon the axial position of an annular seal 85 on a pedal-operated input member 86 relative to a series of circumferentially arranged radial ports 87 passing through the wall of body member 81. A space 88 defined in bore 89 of body member 81 in front of the seal 85 communicates permanently with the low pressure chamber 83 so that when the input member 86 is in the position shown in FIG. 5 relative to the body member 81 the ports 87 are in communication with the space 88 to provide communication between the two chambers 82 and 83. On initial forward movement of the input member 86 relative to the body 81 the seal 85 cuts off communication between ports 87 and space 88, and then on further forward movement the prots 87 are placed in communication with atmosphere through a series of circumferentially arranged holes 129 in a radial guide flange 90 at the rear end of input member 86 and through a filter 91 retained in a counterbore 92 at the rear end of the body member 81 by an annular retainer 93 for the rear end of a boot 94 secured at its forward end to housing part 73 by an integral bead 95 received in an annular recess 96 formed in housing part 73.

The rear end of the chamber 82 is sealed by an annular seal 97 through which body member 81 is slidable and which is retained in position in abutment with the portion of housing part 72 which defines the annular recess 96 by an annular retainer assembly 98.

A pedal-operated rod 99 is formed with a round head 100 at its forward end and the head 100 is retained in a forwardly extending blind bore 101 in input member 86 by a dimple 102 pressed inwardly from the base of an annular recess 103 in the member 86. At its forward end the member 86 is integrally formed with an axially extending stepped spigot 104 having a portion 105 of larger diameter and a portion 106 of smaller diameter. A first thrust member 107 of a first thrust assembly comprises an oblong rectangular block provided with an axial hole 110 to receive the smaller diameter portion 106 of the spigot 104, the thrust member 107 being retained in abutment with the step between the portions 105 and 106 of the spigot 104 by deforming the free end of the protion 106 into a frusto-conical counterbore 108 to the hole 110 to form a head 111.

The first thrust member 107, as shown in FIG. 6, defines a cam wall 114 normal to the axis of the input member and is axially slidable within a diametral slot 112 in a cylindrical second thrust member 113 defining cam walls 115, 116 of a second thrust assembly. The thrust member 13 is constituted by the larger diameter portion of the body member 80. The cam walls 114, 115 and 116 shown in FIG. 6, are coplaner when the input member 86 is in the retracted position shown in FIG. 5. A third thrust member 117, common to the first and second thrust assemblies comprises a plate 118 defining a cam wall 128 extending in a plane normal to the axis of the booster assembly and provided with a forwardly extending tubular extension 119 within which is retained by a circlip 120 a head 121 of an axial output rod 122, which constitutes the output member, a ball 123 being held captive in an axial recess in the head 121 to provide a thrust bearing of low friction between the third thrust member 117 and the output rod 122 to permit relative rotation of the member 117 and rod 122. A first pair of diametrically opposed balls 124 is received in recesses 125 formed in the cam walls 114 of the first thrust member 107 and in corresponding recesses 126 formed in the rearwardly facing cam walls 128 of the third thrust member 117, and a pair of diametrically opposed balls 126 is received in similar recesses 128 formed in the cam walls 115 and 116 of the second thrust member 113 on opposite sides of the slot 112 and in corresponding recesses, not shown, formed in the cam walls 128 of the third thrust member 117. The recesses with which the balls 124 and 127 co-operate each extend circumferentially about the common axis of the thrust members and are of progressively decreasing depth in the circumferential direction to define ramp surfaces for the balls.

It will be noted that the balls 124 of the first thrust assembly are arranged circumferentially intermediate the balls 126 of the second thrust assembly so that axial thrust forces in the thrust assemblies do not lead to tilting of the thrust members.

The second thrust member 113 is an interference fit at its rear end within the tubular extension 78 to hold it against rotation, and a tubular sheet metal cover 130 with an inturned flange 131 at its forward end is an interference fit over the forward end of the secind thrust member 113. A compression spring 132 acts between the flange 131 and the thrid thrust member 117 to bias the third thrust member 117 rearwardly.

The output rod 122 at its forward end extends through a seal assembly 133 retained within a rearwardly extending tubular portion 134 of the housing part 72 which locates the forward end of a return spring 135 bearing upon the diaphragm plate 76.

Figure 7:
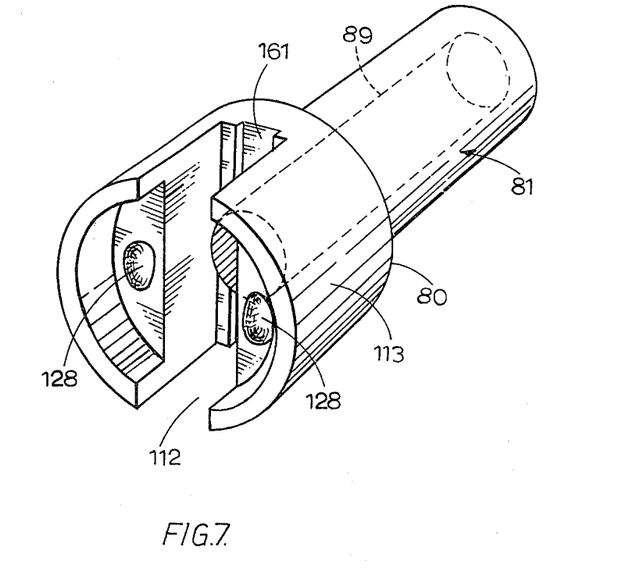
FIG. 7 is a perspective view of the body member of the booster assembly of FIGS. 5 and 6.

The body member 81, as shown in FIG. 7, is formed at the base of the slot 112 with a diametrically extending recess 161 which provides permanent communication between pressure chamber 83 and 88.

The operation of the booster assembly will now be described. On initial forward movement of the pedal-operated rod 99 and the input member 86 the first thrust member 113 moves forwardly to load the balls 124 and thereby transmit the input force to the third thrust member 117 and to the output rod 122. Simultaneously the chambers 82 and 83 of the booster assembly are isolated from each other, and the chamber 82 is connected to atmosphere as has previously been described in more detail. Owing to the ramp surfaces of the first thrust assembly a couple is generated within the first thrust assembly which rotates slightly the third thrust member. The pressure difference between chambers 82 and 83 results in the application of a forward axial force to the body force to the body 81 and second thrust member 107, and this force is transferred to the third thrust member 117 by the balls 127 of the second thrust assembly to boost the force applied to the output rod 122. Thus the output rod 122 is subjected to the sum of the axial forces applied by the body 81 and input member 86. The couple generated in the second thrust assembly by the balls 127 in response to the booster force acts in opposition to the couple produced in the first thrust assembly, and since the first thrust member 107 is keyed against angular movement to the second thrust member 113, and the third thrust member is common, a state of equilibrium is achieved when the two couples are of equal size.

This in the state of equilbrium the force applied to the output member is equal to the sum of the forces applied to the body 81 and to the input member 86, and the couples generated in the two thrust assemblies are equal.

Thus output force $F_O$=input force $F_I$+boost force $F_B$.

The couple generated by the first thrust assembly which is subjected to the force $F_I$ is $F_I R_I \tan \theta$, where $R_1$ is the radial distance of the balls 124 of the first thrust assembly from the axis, and $\theta$ is the ramp angle of the recess 125.

The couple generated by the second thrust assembly which is subjected to the force $(F_O - F_I)$ is $(F_O - F_I) R_2 \tan \alpha$ where $R_2$ is the radial distance of the balls 127 from the axis, and $\alpha$ is the ramp angle of the recess 128.

Since the couples are the same:

$$F_I R_1 \tan \theta = (F_O - F_I) R_2 \tan \alpha$$

To obtain a boost ratio 2;1, $F_O = 2F_I$, and where $R_1 = R_2$ then $\theta = \alpha$ is the required condition in this case.

With these parameters the balls 127 are subjected to the same loading as the balls 124. Thus the output force is shared evenly between the balls.

It will be appreciated that the boost ratio may be altered by altering the ratio $R_1/R_2$ or the ratio $\alpha/\theta$.

On reduction of the force applied to the rod 99 the output force causes reverse angular movement of the third thrust member 117 resulting in reverse movement of the body 81 relative to the input member 86 so that the chamber 82 is isolated from atmosphere and is reconnected to the chamber 83 to reduce the boost force.

Figure 8:
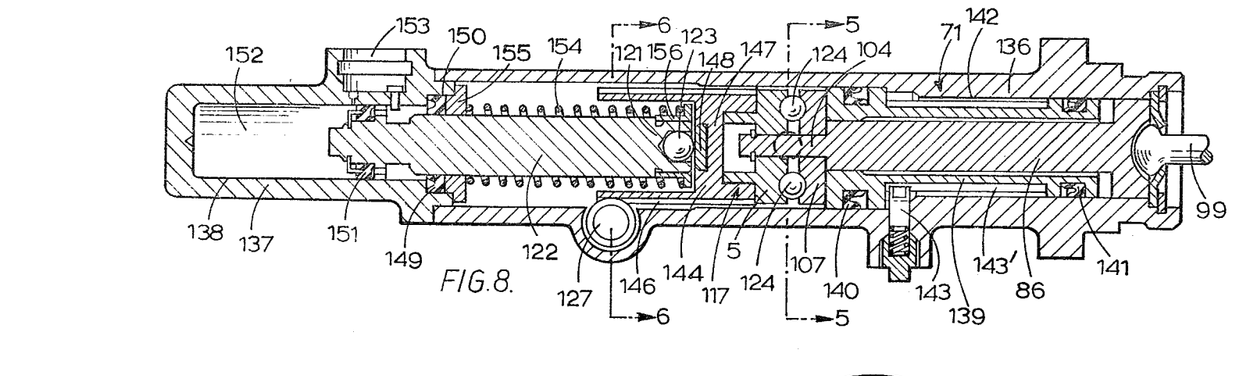
FIG. 8 is a longitudinal cross-section through a combined hydraulic master cylinder and hydraulically operated booster assembly, with the pedal-operated input member being shown in its retracted position.
Figure 9:
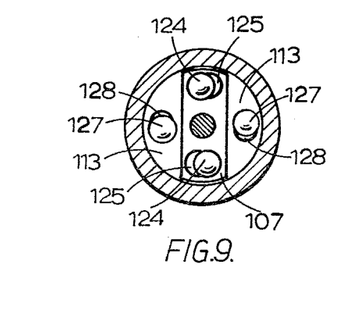
FIG. 9 is a cross-sectional view similar to FIG. 6 but taken on the line 5—5 of FIG. 8.
Figure 10:
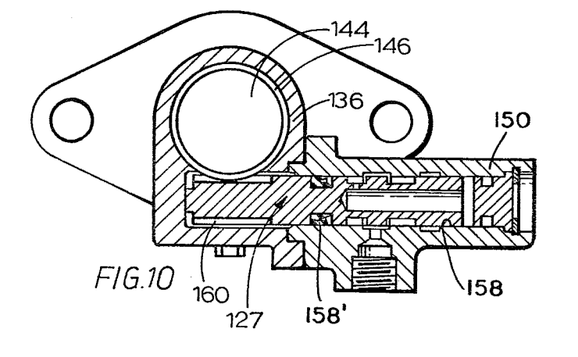
FIG. 10 is a cross-sectional view taken on the line 6—6 of FIG. 8 and showing the connection between the spool valve member and the output thrust member, the spool valve member being shown in the position it occupies when the output thrust member is in a retracted position.

In the embodiment of FIGS. 8 to 10 corresponding reference numerals have been used to indicate parts corresponding to those of the embodiment of FIGS. 5 to 7. In this embodiment the housing 71 comprises a tubular rear portion 137 formed with a blind bore 138 and having a threaded engagement with housing protion 126. The diaphragm assembly of the first embodiment is replaced in this embodiment by a stepped annular booster piston 139 working in the bore of housing portion 136 and provided with axially spaced annular seals 130 and 131, an hydraulic pressure chamber 142 being defined between the stepped booster piston 139 and the stepped bore. A spring-loaded peg 143 located in a transverse bore of housing portion 136 acts as a key against rotation for the booster piston 139 through its engagement with an axial recess 143' in piston 139.

The arrangement of the first and second thrust members is substantially the same as that of the embodiment of FIGS. 5 to 7, but the output thrust member of this embodiment is formed in two parts 134 and 135 having a threaded engagment with each other, the part 144 comprising a cylinder formed externally with axially extending splines 146 and internally with a partition wall 147. The wall 147 is formed in its front surface with a recess in which is retained a hard bearing plate 148 engaged by ball 123 to effect a coupling with output member 122.

The output member 122 works through a seal 129 retained in a counterbore 150 to the bore 138 of the housing portion 137 and at its forward end carries a seal 151 working in bore 138 to define a master cylinder chamber 152. Housing portion 137 is provided with conventional formations 153 for connection to a master cylinder reservoir.

A compression spring 154 mounted in output member 122 bears at its forward end against a stepped washer 155 to retain seal 150 in position and at its rear end on a flanged collar 156 retained on head 121 to urge the member 122 and output thrust assembly 117 rearwardly.

A spool valve 157 works in a transverse bore 158 formed in part in housing portion 136 and in part in a further cylindrical housing portion 150 having a threaded engagement with housing portion 136. The spool valve member is formed at its inner end with a series of annular rack teeth 160 meshing with the splines 146 on output member 122 such that rotation of the output thrust assembly 117 in either direction is accompanied by movement of spool valve member 157 axially of bore 158.

Spool valve member 157 is formed with various lands and with a seal 158', the arrangement being such that on axial movement of member 157, a connection from booster pressure space 142 is first isolated form a reservoir connection and is then connected to a source of hydraulic pressure to pressurise the booster pressure space 142. On retraction of the spool valve member 157 the booster pressure space 142 is reconnected to reservoir.

Since there is a direct connection between the output thrust assembly 117 and the spool valve member 157 the valve action is controlled positively in response to the pedal force applied to the input member 86.

I claim:

1. A servo booster assembly for a vehicle braking system comprising a housing, an axially movable wall located in said housing, valve means controlling a fluid pressure differential applied to said movable wall, an axially movable input member adapted to be connected to a foot pedal, an axially movable output member, a first thrust assembly interposed between said input member and said output member for transmitting force from said input member to said output member, a second thrust assembly interposed between said movable wall and said output member for transmitting force from said movable wall to said output member, each thrust assembly comprising: a pair of confronting, relatively angularly movable and axially displaceable cam walls lying in planes normal to the axes of said input and output members and each having inclined circumferentially extending ramp surfaces thereon, and bearing elements located between said cam walls and engaging with said ramp surfaces; said booster assembly further comprising: means for holding one of said cam walls of said first thrust assembly against angular movement relative to one of the cam walls of the second thrust assembly and means for holding the other cam wall of said first thrust assembly against angular movement relative to the other cam wall of the second thrust assembly.

2. A servo booster assembly as in claim 1 wherein said housing is provided with a chamber in which said valve means is located, and said valve means is operated by angular movement relative to said housing of one of the cam walls.

3. A servo booster assembly as in claim 2 wherein said chamber comprises a bore extending substantially transversely with respect to the rotational axis said one cam wall cam walls, said valve means comprises a spool valve member slidable in said bore, and the cam wall which operates said valve means is secured against rotation to a pinion meshed with a rack connected to said spool valve member.

4. A servo booster assembly in claim 3, wherein the cam wall which operates said valve means is the cam wall that acts upon said output member.

5. A servo booster assembly as in claim 1 wherein said one cam wall of said first thrust assembly is acted upon by said input member, said one cam wall of said second assembly is acted upon by said movable wall, said means holding said one cam walls against relative rotation comprises key means keying said one cam walls together but permitting relative axial movement thereof, and a single output cam wall acting on said output member constitutes said other cam walls of both thrust assemblies.

6. A servo booster assembly as in claim 5, wherein the arrangement of the thrust members is such that the bearing elements of said first thrust assembly lie substantially in the same plane transverse to the common axis of the assemblies as the bearing elements of said second thrust assembly.

7. A servo booster assembly as in claim 6, wherein the bearing elements of said first assembly are angularly disposed intermediate bearing elements of said second assembly.

8. A servo booster assembly as in claim 7 wherein the bearing elements of both thrust assemblies are located at substantially the same radial distance from the common axis of the two thrust assemblies.

9. A servo booster assembly as in claim 7 in which a first of said one cam walls that are keyed together is mounted in a substantially radially extending recess in that face of a second of said one cam walls which opposes said output thrust member.

10. A servo booster assembly as claimed in claim 9 in which each thrust assembly has only two bearing elements and said first cam wall comprises an oblong rectangular block received in a diametral slot in said second cam wall, the two bearing elements of one assembly co-operating with diametrically spaced portions of the block, and the two bearing elements of the other assembly co-operating with portions of the said second cam wall respectively on opposite sides of the slot.

11. A servo booster as in claim 1 wherein said one cam wall of said second thrust assembly acts upon said output member, and said one cam wall of said first thrust assembly is acted upon by said input member said means holding said one cam walls against relative angular movement comprises key means keying said one cam walls together but permitting relative axial movement thereof, and wherein said two other cam walls are constituted by opposed faces of a single member positioned axially between said one cam walls.

12. A servo booster assembly as in claim 11 wherein said key means comprises an axially extending arm, and said single member is provided with an aperture through which said arm extends.

13. A servo booster assembly as in claim 11, including means holding the movable wall against rotation relative to said single member, and wherein said single member is subjected to a substantially zero couple during operation.

14. A servo booster assembly as in claim 13 including thrust bearings between the input member and said one cam wall of said first thrust assembly, and between the output member and said one thrust member of said second thrust assembly.

* * * * *